April 5, 1955

C. J. PETO 2,705,438

SINGLE MAGAZINE SLIDE PROJECTORS

Filed Feb. 28, 1950

INVENTOR.
Conrad J. Peto
BY
Zabel & Gritzbaugh
Attorneys

April 5, 1955 C. J. PETO 2,705,438
SINGLE MAGAZINE SLIDE PROJECTORS
Filed Feb. 28, 1950 9 Sheets-Sheet 8

INVENTOR.
Conrad J. Peto
BY
Zabel & Gritzbaugh
Attorneys

United States Patent Office 2,705,438
Patented Apr. 5, 1955

2,705,438

SINGLE MAGAZINE SLIDE PROJECTORS

Conrad J. Peto, Chicago, Ill., assignor to Revere Camera Company, Chicago, Ill., a corporation of Delaware Application February 28, 1950, Serial No. 146,655

6 Claims. (Cl. 88—28)

This invention relates to slide projectors and in particular to projectors for successively projecting a number of slides onto a screen.

It is an object of my invention to provide a projector in which the slides are arranged in a single magazine from which the slides may be successively displaced into projecting position and to which magazine each slide is returned after projection.

It is another object to provide a projector in which the mechanism is caused to operate in a cycle of operation which commences and terminates at a time when a slide is in projecting position. Thus, the interval between successive cycles, which interval can be controlled by the operator, is the time during which the slide is projected onto the screen. In this connection, it is a further object of my invention to provide means for stopping the mechanism midway of the cycle of operation at the time when the slide has been returned to the magazine and prior to the displacement of the next succeeding slide therefrom. Thus, the magazine may be removed from the projector at a time when all of the slides are contained therein.

It is a still further object to provide a slide projector which will accommodate slides of different thicknesses such as glass slides and paper slides, and which embodies means for automatically focusing the projector to compensate for the differences in slide thicknesses.

It is a still further object to provide a slide projector embodying novel and positively operating slide displacing means. In this connection, I have provided slide displacing means which extend into and through the magazine at certain times, in combination with means for completely withdrawing said slide displacing means and associated parts from the magazine so that the magazine may be advanced to a position in which another slide may be displaced therefrom.

It is a further object of my invention to provide an improved mechanism for coordinating the displacement of the slides to and from projecting position with means for advancing the magazine and the means for controlling the cycle of operation.

Other objects, features and advantages will become apparent as the description proceeds.

Figure 1:
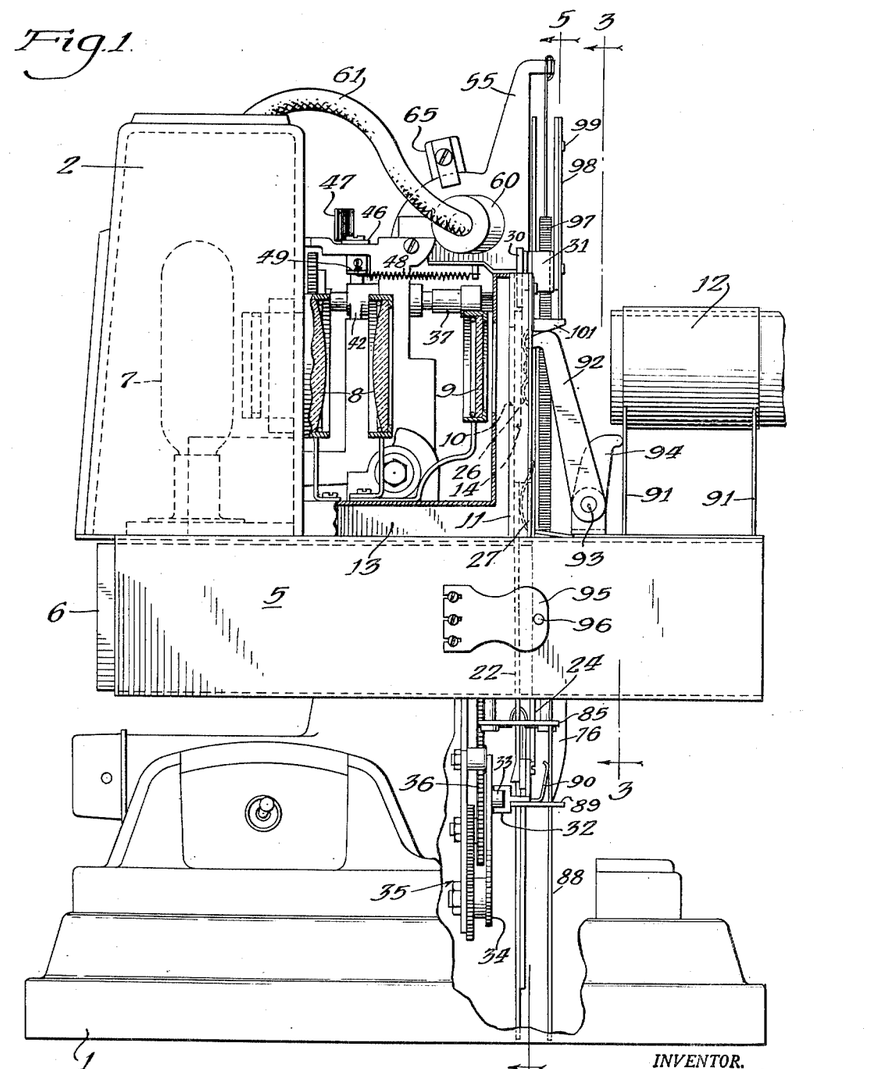
Fig. 1 is a left side elevation of a preferred embodiment of my invention showing the parts in normal position.
Figure 4:
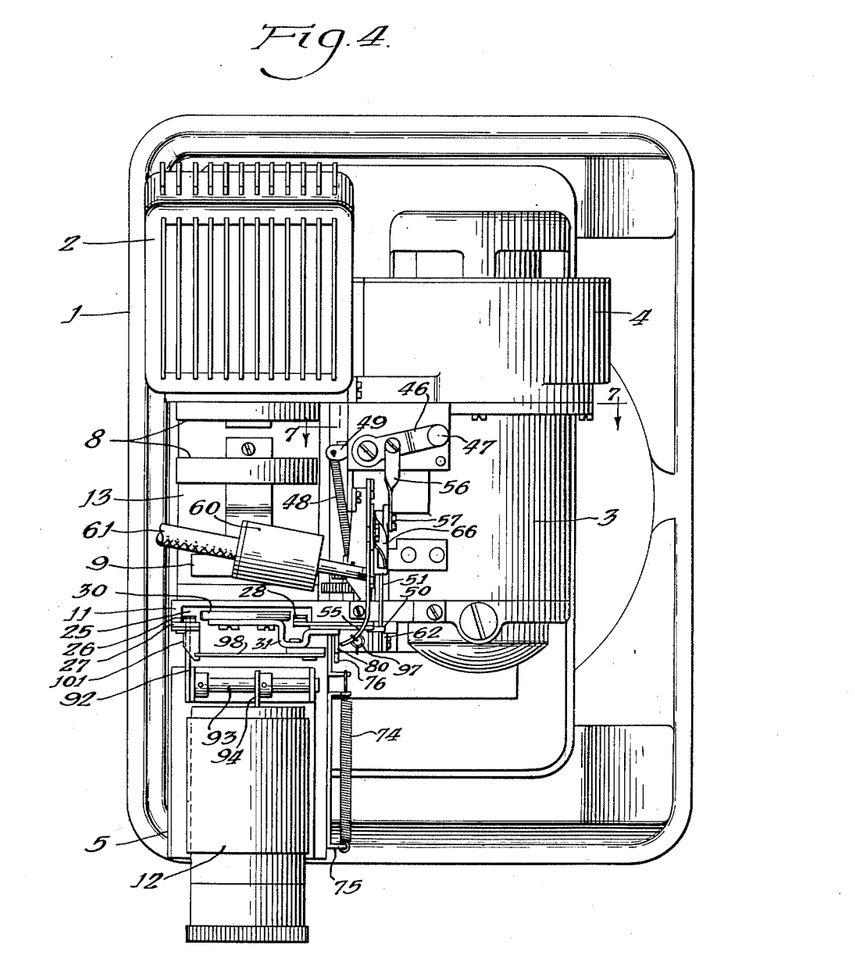
Fig. 4 is a plan view.

With reference to Figs. 1 and 4 the projector comprises a base 1 which supports a lamp housing 2, a motor 3 and a blower 4 which is suitably driven by the motor to produce an air blast for cooling the lamp housing. The projector also includes a magazine holder 5 which is a box-like structure open at both ends to provide a horizontally disposed passageway of rectangular cross section, through which passageway a slide magazine 6 is advanced step by step. The magazine is shown in Figs. 5, 6, 22 and 23.

Disposed above the magazine holder are means providing a path for a light beam, which means include a lamp 7 disposed in the lamp housing 2, condensing lens 8, a suitable heat barrier 9 and a rectangular aperture 10 which is formed in the supporting plate 11. A projection lens 12 is disposed in front of the plate 11. The elements 8 and 9 are suitably mounted on the walls of an L-shaped conduit 13 through which a portion of the air blast is directed so as to cool the slide 14 which is maintained in slide projecting position overlying the aperture 10, as shown in Fig. 5.

Figure 2:
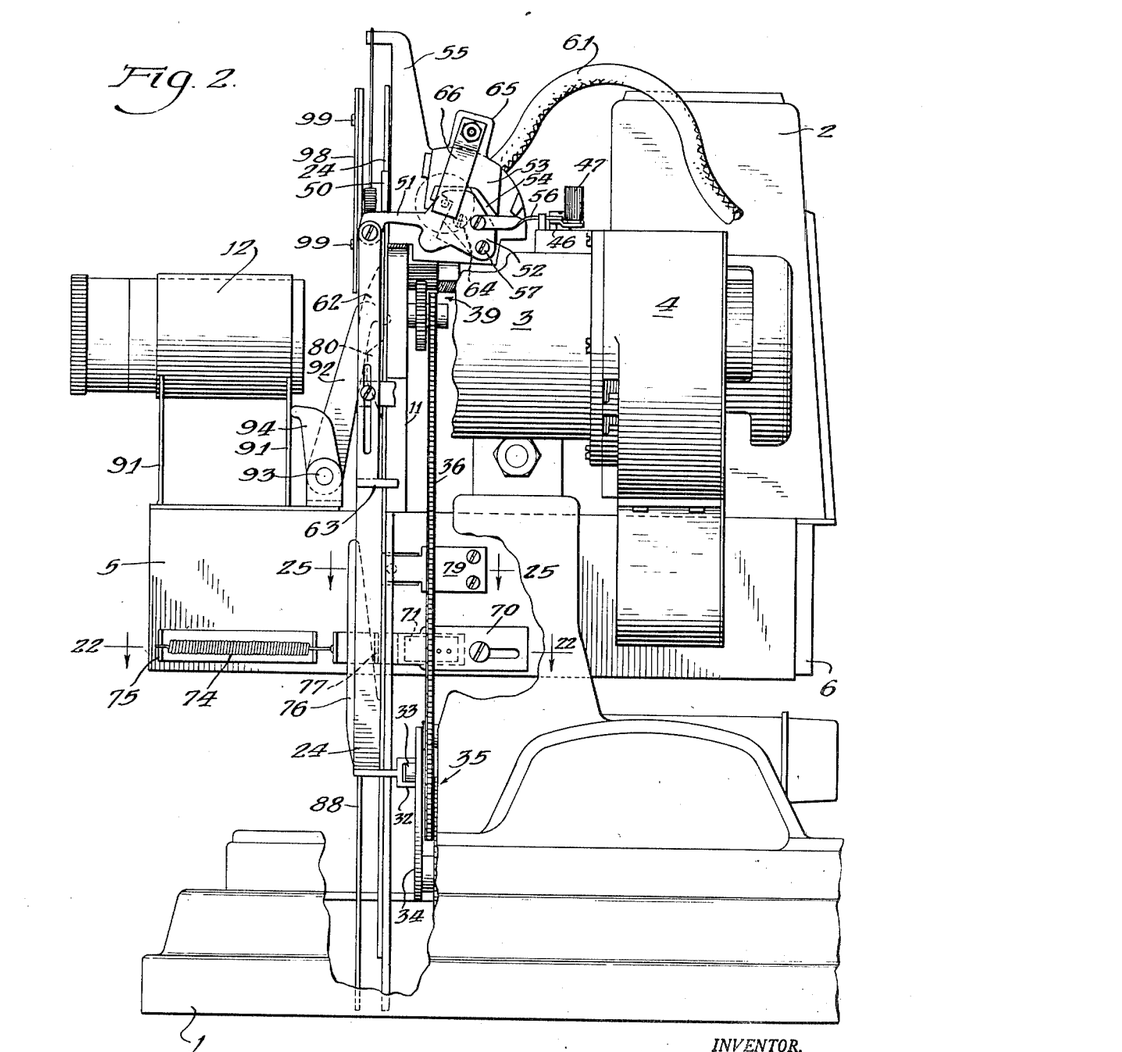
Fig. 2 is a right side elevation.
Figures 3, 33:
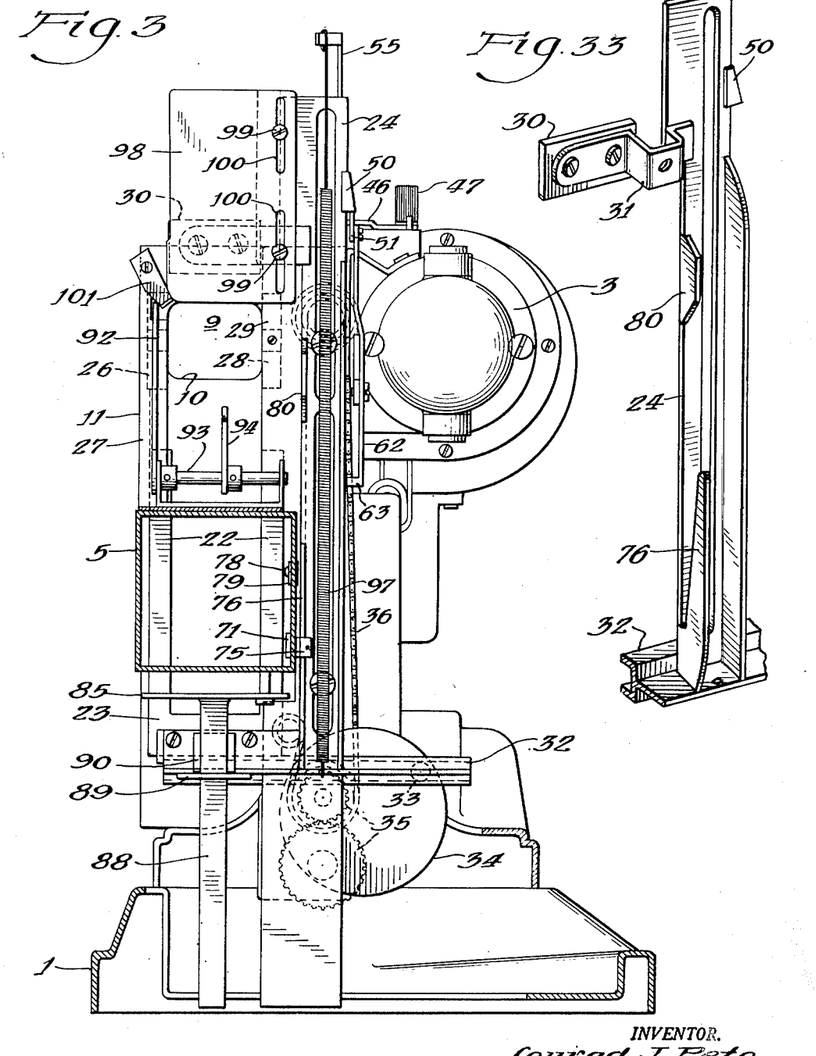
Fig. 3 is a front view taken along line 3—3 of Fig. 1 showing certain of the parts in section.
Fig. 33 is a detailed view of the control member.
Figure 5:
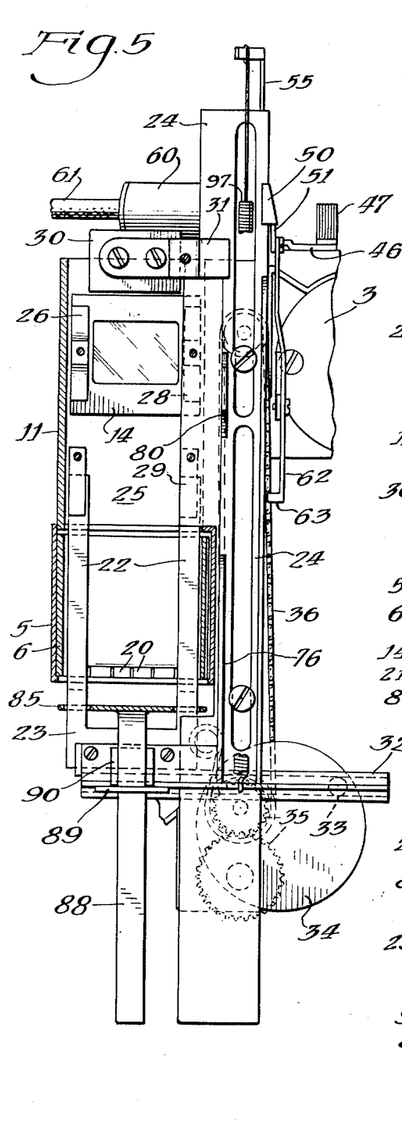
Fig. 5 is a section taken along line 5—5 of Fig. 1 showing a slide in projecting position.
Figure 6:
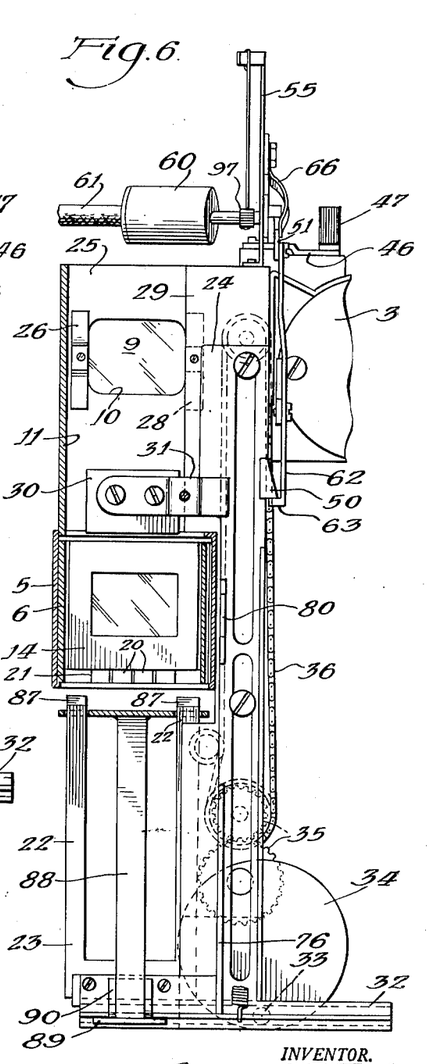
Fig. 6 is a section similar to Fig. 5 but showing the parts in changed position, with the slide returned to the magazine.
Figure 32:
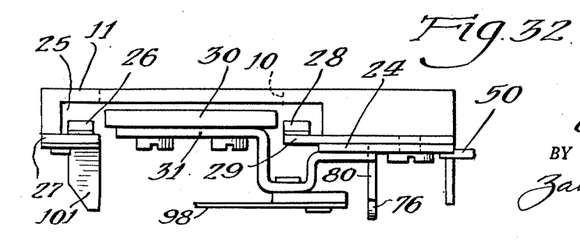
Fig. 32 is an enlarged detailed plan view showing the relationship of the control member to the slide path.

The magazine 6 is adapted to hold a plurality of slides which are elevated from their position in the magazine, as shown in Fig. 6, into projecting position as shown in Fig. 5. The magazine comprises side walls 15 and 16 which are connected at the front and rear by end walls 17. A plurality of partitions 18 extend from one side wall to the other and form a plurality of slide compartments 19 which are open at the top and which are partially open at the bottom. The lower marginal portions of the partitions 18 are formed so as to provide inner lugs 20 and outer lugs 21 as shown in Figs. 27 to 30. The outer lugs of one partition cooperate with the outer lugs of an adjacent partition to form supporting means for a slide which is disposed within the compartment, and the inner lugs extend in the other direction to cooperate with similarly disposed inner lugs on the other adjacent partition. The bottom of each compartment 19 is open at a point outwardly of the outer lugs so as to permit slide elevators 22 to be projected into and through the compartment so as to elevate the slide in that compartment from its magazine position into projecting position. The slide elevators 22 are in the form of two fingers which form a part of a U-shaped member 23 which is carried by a slidably mounted control member 24. The supporting plate 11 is provided with a recess 25, shown in Figs. 4 and 32, which recess accommodates the slide 14 and the elevators 22. A slide which has been elevated into projecting position is maintained in that position by means of springs 26 and 28 which urge the slide against the recessed surface of the supporting plate 11. These springs are in the form of double leaf springs, one of which is carried by and projects rearwardly from a small bracket 27, as shown in Fig. 32, and the other one of which is similarly carried by a plate 29. The plate 29 is secured to the supporting plate 11 and is of substantial area; it extends downwardly into the base 1, as shown in Figs. 2 and 3 and forms a bearing surface on which the control member 24 is mounted.

An ejecting lug 30 is mounted on the upper portion of the control member 24 by means of a suitable bracket 31. Thus, as the control member moves upwardly, it will cause the elevators to displace a slide from that one of the magazine compartments which registers with the elevators, and to elevate that slide into projecting position as shown in Fig. 5. As the control member moves downwardly, the slide will be maintained in projecting position by the springs 26 and 28 until the upper edge of the slide is engaged by the ejecting lug 30 after which the slide is forced downwardly and is returned to its position in its compartment.

Figures 7, 8, 9, 10, 11:
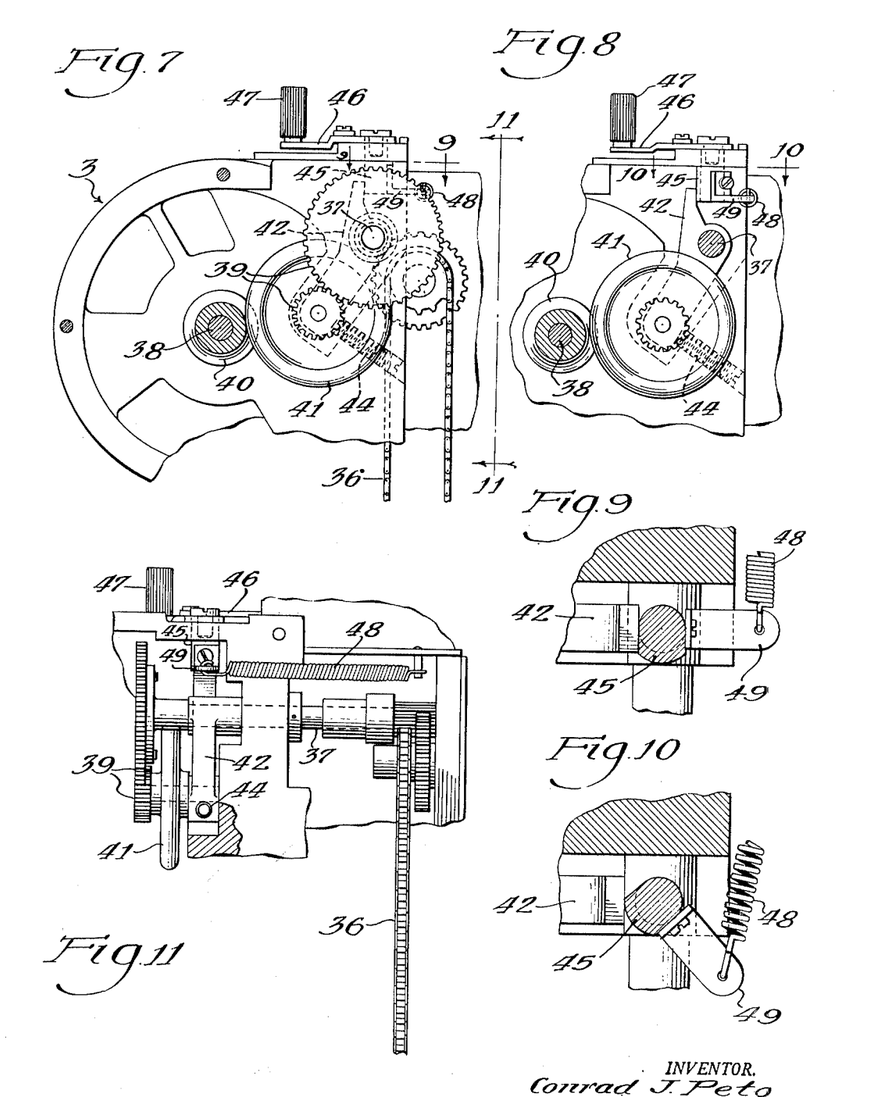
Fig. 7 is a vertical section taken along line 7—7 of Fig. 4 showing the clutch means in engaged position.
Fig. 8 is a fragmentary view similar to Fig. 7 showing the clutch means in disengaged position.
Fig. 9 is a section taken along line 9—9 of Fig. 7 showing the cam in clutch engaged position.
Fig. 10 is a section taken along line 10—10 of Fig. 8 showing the cam in clutch disengaged position.
Fig. 11 is a fragmentary vertical section taken along line 11—11 of Fig. 7.

The control member carries at its lower portion a cross head 32 in the form of a channel which is adapted to receive a roller 33 carried on a crank wheel 34. Thus, the control member is reciprocated by the rotation of the crank wheel. The crank wheel is driven, through suitable gearing 35, by a chain 36 which chain extends downwardly from a drive shaft 37, as shown in Fig. 1. The drive shaft is driven from a motor shaft 38 through suitable gearing 39 and through clutch means, as shown in Fig. 7. The clutch means includes a rubber pulley 40 which is secured to the motor shaft 38 and it drives a pulley wheel 41 which is carried by an arm 42, the arm being mounted on a pivot 37. A suitable spring 44 urges the pulley wheel 41 into engagement with the rubber pulley 40. Thus, the driving connection between the motor shaft 38 and the drive shaft 37 may be broken by displacing the arm 42 against the bias of spring 44. A cam 45 suitably mounted in the motor housing, as shown in Figs. 9 and 10 is provided for controlling the position of the arm 42. The position of the cam is regulated by clutch lever 46 which is provided with a knob 47 for manual operation of the clutch. A spring 48 is tensioned between arm 49, secured to cam 45 and a portion of the motor housing so as to bias the clutch lever into clutch engaged position, as shown in Figs. 7 and 9. When the clutch lever is rotated in the clockwise position as shown in Fig. 4, against the bias of springs 44 and 48, the clutch will be disengaged.

The operation of the clutch lever is automatically controlled by the control member 24 so that the mechanism will be caused to go through a complete cycle of operation, starting with the slide in projecting position as shown in Fig. 5, and which cycle of operation includes the return of the slide to the magazine, the advance of the magazine so that the next compartment is brought into registry with the elevators, and the displacement of the next slide into projecting position, at which point the cycle of operation is concluded and the clutch is automatically disengaged.

Figures 16, 17, 18, 19, 20, 21:
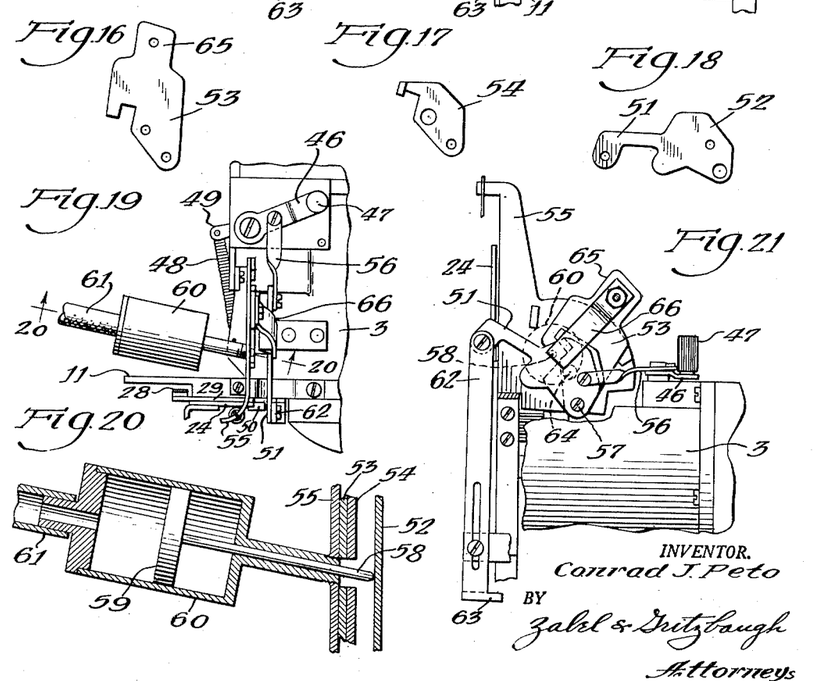
Figs. 16, 17 and 18 are details showing the shape of the plates shown in Figs. 14 and 15.
Fig. 19 is a plan view of Fig. 12.
Fig. 20 is an enlarged sectional view of the cylinder and trip actuating mechanism taken along line 20—20 of Fig. 19.
Fig. 21 is a view similar to Fig. 13 but showing the trip mechanism adjusted for disconnecting the clutch at the middle of the cycle.

The means for tripping the clutch lever 46 includes a cam 50 on the control member 24 which is adapted to engage an arm 51 formed on a rock plate 52. The latter is pivotally mounted on and overlies a mounting plate 53 and a stop plate 54. The plates 53 and 54 are in turn pivotally mounted on a bracket 55 by means of a shoulder screw 64. A link 56 connects the rock plate 52 and clutch lever 46; the spring 48 which urges the clutch lever 46 in the counterclockwise direction as shown in Fig. 19 also urges the link 56 rearwardly and the arm 51 upwardly. The arm 51 is engaged by the cam 50 on the down stroke of the control member with the result that the clutch lever 46 is pulled forwardly into clutch disengaged position, and is maintained in such disengaged position until the arm is tripped. On the up stroke of the control member, the arm 51 is cammed to one side. A shoulder screw 57 serves as the pivotal mounting for the rock plate 52 and permits the same to wobble in such a manner that the arm 51 may be laterally displaced, either by the cam 50 or by the tripping means hereinafter described. The tripping means comprises a plunger 58 which is connected to a piston 59 in a cylinder 60. A tube 61 is connected to the cylinder, and the piston and plunger are projected or retracted by means of the usual bulb not shown. When the plunger is projected, it extends through suitable openings in the plates 53 and 54, and engages the rock plate 52 as shown in Fig. 20. This causes the arm 51 to be displaced laterally so that it clears the cam 50 with the result that the spring 48 will cause the clutch to become engaged, thus causing the control member to move downwardly. When the plunger 58 is in its retracted position, it clears plates 53 and 54 and permits the rock plate 52 to assume its normal position in which a leaf spring 66, mounted on a lug 65 of mounting plate 53 urges the rock plate 52 against the stop plate 54.

Figures 12, 13, 14, 15:
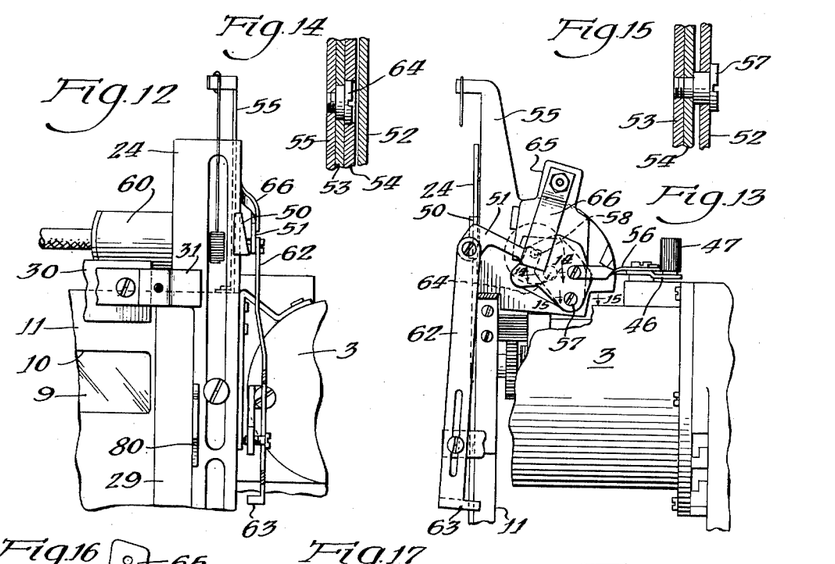
Fig. 12 is a view similar to Fig. 5, but showing the trip mechanism immediately after tripping.
Fig. 13 is a side view of Fig. 12.
Fig. 14 is a detailed section taken along line 14—14 of Fig. 13.
Fig. 15 is a detailed section taken along line 15—15 of Fig. 13.

Means are provided to cause the clutch to become disengaged when the slide is at the bottom of its stroke so that the magazine 6 may be removed from the magazine holder 5, and a new magazine inserted. This means comprises a link 62 which is secured to the outer end of arm 51 and extends downwardly therefrom. The lower end of the link is provided with a foot 63 which is adapted to be engaged by the cam 50 under certain conditions. The length of the link is approximately equal to the throw of the control member 24 so that during normal operation, the foot 63 is disposed just below the lowest point in the travel of the cam 50. Means are provided to shift the position of plates 52, 53 and 54 so that the link 62 is raised into position in which the foot 63 will be engaged by the cam 50 at the bottom of its down stroke, thus disengaging the clutch. Such means comprises the rotatable mounting provided for the mounting plate 53; rotation of the mounting plate, by the application of pressure to the lug 65, from its Fig. 13 position into its Fig. 21 position, will cause the arm 51 to be elevated, since the spring 48 tends to hold the arm against a stop lug 67 provided on the stop plate 54. Thus the foot is brought into a position wherein it will serve to depress the arm 51 and disconnect the clutch.

Figures 22, 23, 24, 25:
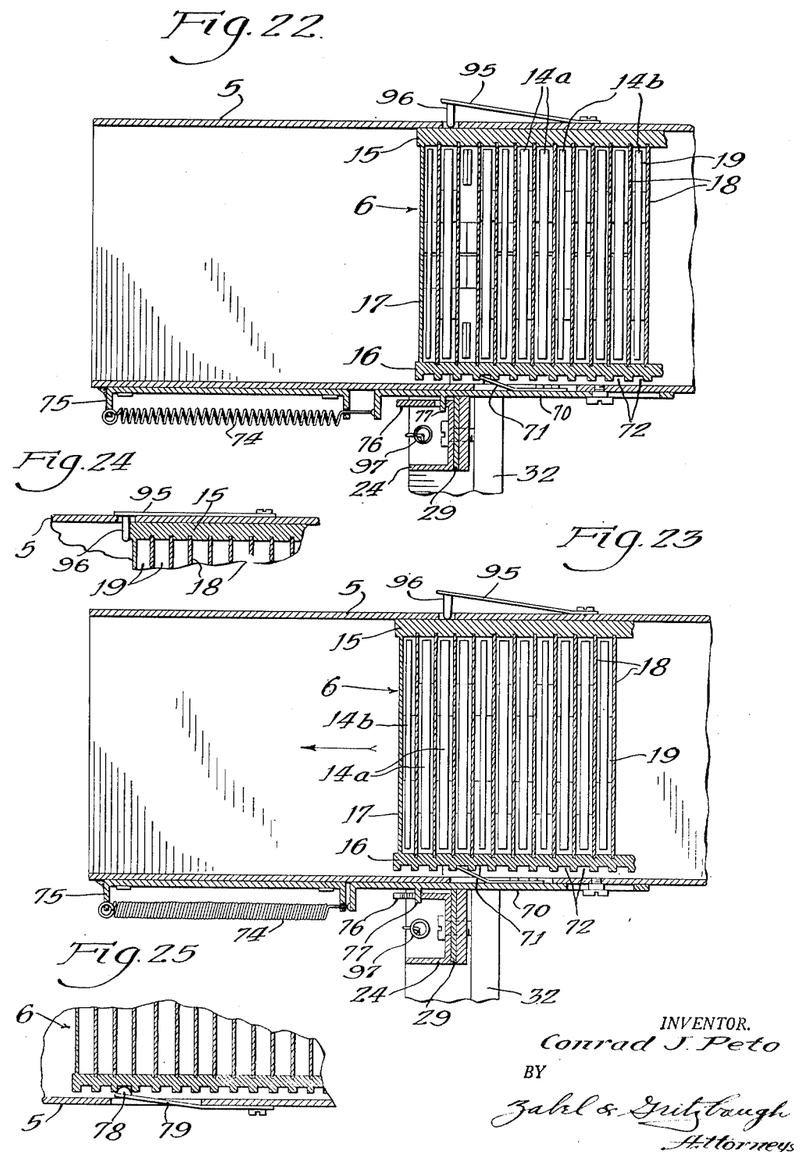
Fig. 22 is a horizontal section along line 22—22 of Fig. 2 showing the magazine in the magazine holder with one of the slides elevated into projecting position.
Fig. 23 is a view similar to Fig. 22 but showing the magazine with the slide returned and the magazine advanced one position.
Fig. 24 is a detail showing the operation of the locating pin.
Fig. 25 is a section taken along line 25—25 of Fig. 2 showing the ball detent for positioning the magazine.

Means are provided for advancing the magazine 6 at a time when the elevators 22 are retracted and clear of the magazine. This means includes a bar 70 mounted for reciprocating movement on the exterior of the side wall of the magazine holder 5, as shown in Figs. 2, 22 and 23. The bar 70 is provided with a pawl 71 which engages notches 72 formed in the side wall 16 of the magazine 6. The distance between the notches corresponds to the width of the compartments 19, so that reciprocation of the bar 70 will cause the magazine to be advanced step by step so that the successive compartments overlie and register with the elevators 22. The pawl 71 extends through a suitable slot 73 formed in the wall of the magazine holder 5. A spring 74 is tensioned between the bar 70 and a suitable bracket 75 which serves to urge the bar and magazine 6 forwardly, into a position determined roughly by the abutting engagement of the bar 70 and bracket 75. The mechanism is cocked by means of a drift cam 76 carried on the control member 24; on the upward stroke of the control member, the drift cam engages a lug 77 on the bar 70 which displaces the bar rearwardly so that the pawl 71 drops into the next notch 72. The magazine tends to remain stationary during the cocking operation due to the provision of a ball detent 78 which is carried on a leaf spring 79 shown in Fig. 25. The action of the ball detent is stronger than the force exerted by spring 74 with the result that the magazine will remain in its original position until such time as the lug 77 is engaged by a cam 80 carried on the control member 24. The cam is so positioned that it engages the lug 77 at about the bottom of the stroke, with the result that the magazine will be advanced at a time when the elevators 22 are retracted from the magazine 6.

Figures 26, 27, 28, 29, 30, 31:
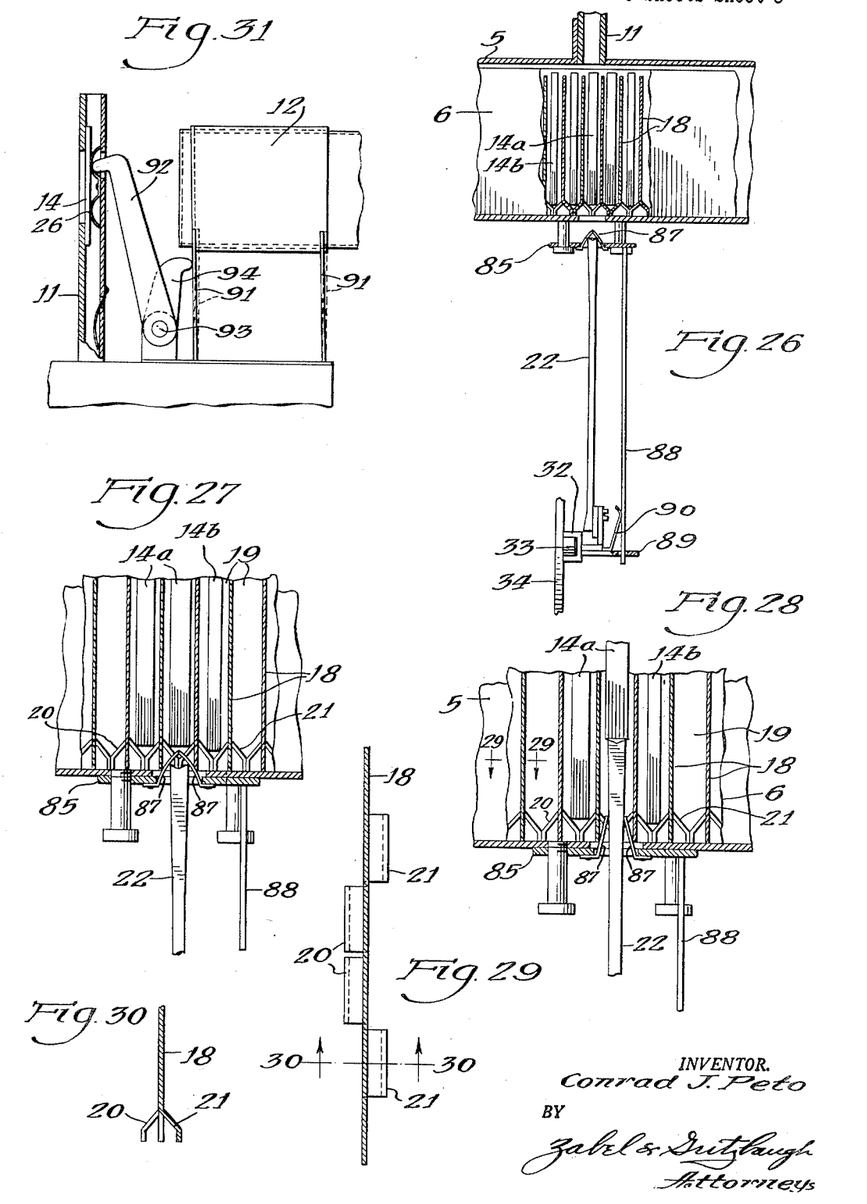
Fig. 26 is a view partially in section showing the operation of the slide elevator and guide.
Figs. 27 and 28 are enlarged detailed views similar to Fig. 26 but showing the parts in changed position.
Fig. 29 is a horizontal section taken along line 29—29 of Fig. 28 showing the disposition of the slide supporting lugs.
Fig. 30 is a section taken along line 30—30 of Fig. 29 showing the arrangement of the slide supporting lugs.
Fig. 31 is a view showing the operation of the mechanism for automatically adjusting the lens focus in accordance with the thickness of the slide.

The slide elevators 22 are maintained in centered position with respect to the particular compartment which is in registry with the elevators, by means of a guide 85 which is in the form of a plate mounted on pins 86 which depend from the magazine holder 5, as shown in Figs. 26 to 28. The plate is apertured and provided with cooperating spring members 87 in the form of an inverted V which are adapted to be spread apart by the top edge of the elevators 22. Two sets of cooperating spring members, one for each elevator, are provided, disposed outwardly of the outer lugs 21 so that they may be projected upwardly into the compartment. The guide 85 includes a vertically disposed tail 88 which extends through a slot formed in a cross bar 89, associated with the cross head 32. A friction spring 90 mounted on the cross bar bears against the tail to provide a slipping frictional connection between the tail and the parts associated with the control member 24. In Fig. 26, the control member 24 is at the bottom of its stroke. Upward movement of the control member will cause the guide 85 to be elevated into the Fig. 27 position along with the elevators. At this point, further upward movement of the guide 85 is blocked, with the result that the edge of the elevator forces the spring members 87 apart. Thus, they serve to guide and to maintain the elevators in centered position, as shown in Fig. 28. As soon as the control member starts its down stroke, the friction spring 90 will cause the guide to be retracted from the magazine holder.

The fact that the lugs 20 and 21 are V-shaped causes the slides 14 to be maintained in centered position irrespective of their width. It will be observed that some slides 14a are wider than other slides 14b. Slides 14a may be glass slides which are thicker than paper slides 14b.

Since the transparency is centered in the slide, that is, sandwiched between two layers of glass or transparent paper as the case may be, the position of the transparency with respect to the optical system will vary as between glass and paper slides. This variation is compensated for by means, as shown in Fig. 31, which shift the position of the projection lens 12.

The projection lens 12 is mounted on two leaf springs 91 which permit displacement of the lens in an axial direction. A feeler arm 92 is mounted on a rotatable shaft 93, above the magazine holder 5 as shown in Figs. 1 and 3. An arm 94 is also secured to the shaft and extends into engagement with one of the leaf springs 91. The upper end of the feeler arm engages the spring 26 with the result that as a slide is elevated into projecting position, the spring and feeler arm 92 will be displaced forwardly, thereby causing the projection lens to be displaced forwardly by a distance that is proportional to the thickness of the slides 14a or 14b, as the case may be. Thus, irrespective of the thickness of the slides, they are accurately centered in their respective compartments and maintained in registry with the elevators 22, and maintained in the proper focus.

At one side of the magazine holder 5 there is mounted a leaf spring 95 as shown in Figs. 1 and 22. This leaf spring is biased outwardly and carries at its end a positioning pin 96. When the magazine 6 is initially inserted into the magazine holder, the operator depresses the leaf spring so that the pin 96 will serve as a stop to position the magazine in the holder.

As shown in Fig. 1, a spring 97 is tensioned between the bracket 55 and the control member 24, and serves as a counterweight to facilitate the sliding motion of the control member.

As shown in Fig. 1, a shutter 98 is slidably mounted on the upper portion of the control member 24 by means of screws 99 which pass through slots 100 formed in the shutter. The slidable mounting of the shutter permits a certain lost motion between the shutter and the control member. The function of the control member is to block off the light beam at all times except when the slide 14 is in projecting position. The slots are so arranged that on the up stroke of the control member, the shutter will be positioned immediately above or in advance of the slide. At the time that the slide is in projecting position, it is engaged by a leaf spring 101 which is mounted on the supporting plate 11. This spring 101 serves as a friction to prevent downward movement of the shutter with the control member until such time as the slide is displaced by the ejecting lug 30. At this time, the screws 99 engage the bottom of the slot 100 and cause the shutter to move downwardly and interrupt the light beam as the slide is being withdrawn.

This lost motion connection permits the shutter to be maintained clear of the magazine so as to permit the magazine to be advanced to bring the next compartment into registry with the elevators 22 and the slide path which is formed by the recessed supporting plate 11.

To summarize the operation, before a magazine is inserted into the magazine holder, the slide is brought into the Fig. 6 position. This may be accomplished by rotating the lug 65 into the Fig. 21 position, after the motor has been turned on. Thus, the cam 50 will engage foot 63 and disconnect the clutch. At this point, both the elevators 22 and the shutter 98 are clear of the magazine holder so that the magazine 6 can be inserted, the positioning pin 96 serving to locate the magazine so that the first compartment lies in the slide path.

Rotating the lug 65 back to its normal position, as shown in Fig. 16, will cause the clutch to become engaged, thereby causing the control member to make a complete up stroke or feed stroke, and to begin its down stroke so that the cam 50 will displace the arm 51. This causes the clutch to again be disengaged, and the parts will remain in the Fig. 5 position.

During the up stroke of the control member, the elevators 22, guided and centered by the guide 85, will have displaced the slide in the first compartment up into projecting position. They are held in this position by leaf springs 26 and 28 even though the elevators are retracted to the extent which is incident to the operation of the arm 51. The parts will remain in this position indefinitely, until the arm 51 is tripped. This is effected by the displacement of the plunger 58 by the air bulb or other suitable means. When the arm 51 is tripped, the clutch is again engaged, and the control member resumes its down stroke or return stroke. The ejecting lug 30 forces the slide out of engagement with the springs 26 and 28 and causes the slide to be returned to its compartment in the magazine, the shutter at this time being moved across the light beam. The downward movement of the control member also causes the guide 85 and the spring member 87 to be retracted from the magazine so that the magazine may be displaced forwardly to bring the next compartment into registry with the elevators.

The advance of the magazine is effected by the engagement of the release cam 80 with the lug 77, which causes the pawl 71 to move the magazine forwardly. The control member continues right on with its up stroke, when the lug 65 is in its normal position, so that the next slide is displaced into projecting position. During the up stroke of the control member, the drift cam 76 cocks the magazine advancing mechanism so that it will be ready for advance in the next succeeding cycle.

Although the slides 14 may vary in thickness, one from the other, the lugs 20 and 21 maintain the slides centered in their respective compartments so that they will be engaged by the elevators. The feeler 92 and associated mechanism shown in Fig. 31 cause the projecting lens 12 to be automatically adjusted so as to compensate for any variation in the thickness of the separate slides.

The lugs 20 and 21, preferably being somewhat resilient, also serve to absorb the shock of the dropping slides, which fall freely in the slide path after the ejecting lug 30 has displaced them out of engagement with the springs 26 and 28.

When all of the slides in the magazine have been projected, the lug 65 is again moved into its Fig. 21 position, after which the control member will come to rest in its Fig. 5 position. The magazine may then be withdrawn and a new magazine inserted.

Although I have shown only a preferred embodiment of my invention, it will be understood that various modifications and changes may be made therein without departing from the scope of my invention as defined in the appended claims.

I claim:

1. A slide projector comprising means providing a path for a light beam, a magazine for maintaining a plurality of slides in a position which is offset from said light path, means for displacing a slide from said magazine into a projecting position in which said slide is disposed in said light path and for returning the same to said magazine, means for advancing said magazine after the return of said slide thereinto so that another slide will be engaged by said slide displacing means, said slide displacing means comprising reciprocating means including two spaced slide engaging elements adapted to engage opposite edges of said slide, one of said elements being in the form of a finger which is adapted to extend into and through said magazine to displace said slide into projecting position, and the other of said elements being effective to return said slide to said magazine, means including a continuously operating motor for causing said slide displacing means to operate through a series of cycles of operation, each cycle comprising a feed stroke and a return stroke, resilient means adapted to bear against a slide when in projecting position to maintain said slide in said projecting position after said slide displacing means has begun its return stroke, said slide engaging elements being spaced from each other by a distance which is greater than the corresponding dimension of the slide so as to permit a lost motion between said slide displacing means and said slide, and clutch means for automatically breaking the driving connection between said motor and said slide displacing means to interrupt the motion of said slide displacing means while said slide is maintained in projecting position by said resilient means.

2. A slide projector as claimed in claim 1 embodying means for stopping said slide displacing means in a position wherein said finger is retracted from said magazine.

3. A slide projector as claimed in claim 1 in which said clutch means includes a displaceable arm movable from clutch engaged position into clutch disengaged position, means biasing said arm into clutch engaged position, cam means associated with said slide displacing means for engaging said arm for moving it into clutch disengaged position, and manually operated means for releasing said arm from engagement with said cam means for permitting said arm to move into clutch engaged position.

4. A slide projector as claimed in claim 3 in which said displaceable arm is mounted for movement in direction both parallel and perpendicular to the motion of said cam means, and in which said manually operated means includes an axially displaceable rod for displacing said arm in said perpendicular direction.

5. A slide projector comprising means providing a path for a light beam, a magazine for maintaining a plurality of slides in a position which is offset from said light path, means for displacing a slide from said magazine into a projecting position in which said slide is disposed in said light path and for returning the same to said magazine, means for advancing said magazine after the return of said slide thereinto so that another slide will be engaged by said slide displacing means, said slide displacing means including a drift cam and a release cam, and said magazine advancing means including a pawl, said magazine being provided with projecting portions, the spacing between which portions corresponds to the spacing of the slides contained in said magazine, means for mounting said pawl for reciprocating movement so that it will engage said projecting portions, spring means biasing said pawl forwardly, said drift cam being mounted so as to engage said pawl mounting means to displace said pawl rearwardly and into engagement with an adjacent projecting portion, and detent means engaging said magazine and tending to hold the same in a predetermined position against the bias of said spring means, said release cam being positioned so as to engage said pawl mounting means so as to force said pawl and said magazine forwardly against the action of said detent means whereby said magazine is advanced so that an adjacent slide is in registry with said slide path.

6. A slide projector comprising a reciprocating control member having a cam, a motor for driving the same, a clutch interposed between said motor and said control member, said clutch including a clutch lever, a mounting plate pivotally mounted on said slide projector for movement between a first position and a second position, a rock plate eccentrically mounted on said mounting plate and having an arm which extends into the path of said cam, means connecting said rock plate and said clutch lever whereby downward displacement of said arm by said cam will move said clutch lever into disengaged position, said arm being positioned so that it will be engaged by said cam at a point above the bottom of its stroke, and a link connected to said arm and having a foot extending into the path of said cam and adapted to be engaged by said cam at the bottom of its stroke when said mounting plate is in said first position, and adapted to be shifted downwardly to an inoperative position beyond the bottom of said stroke when said mounting plate is in said second position whereby said clutch lever may optionally be moved into disengaged position when said cam is at the bottom of its stroke by moving said mounting plate from said second position into said first position.

References Cited in the file of this patent

UNITED STATES PATENTS

| Number | Name | Date |
|---|---|---|
| 330,182 | Wilcox | Nov. 10, 1885 |
| 594,819 | Allen | Nov. 30, 1897 |
| 998,305 | Roebuck | July 18, 1911 |
| 1,069,521 | Bernard | Aug. 5, 1913 |
| 1,402,791 | Petherick | Jan. 10, 1922 |
| 1,634,699 | Upjohn | July 5, 1927 |
| 2,194,828 | Greaves | Mar. 26, 1940 |
| 2,298,413 | Reid | Oct. 13, 1942 |
| 2,427,164 | Stechbart | Sept. 9, 1947 |
| 2,460,359 | Page | Feb. 1, 1949 |
| 2,482,117 | Leas | Sept. 20, 1949 |
| 2,522,760 | Lowber et al. | Sept. 19, 1950 |
| 2,594,162 | Hartley | Apr. 22, 1952 |